Figure 2B:
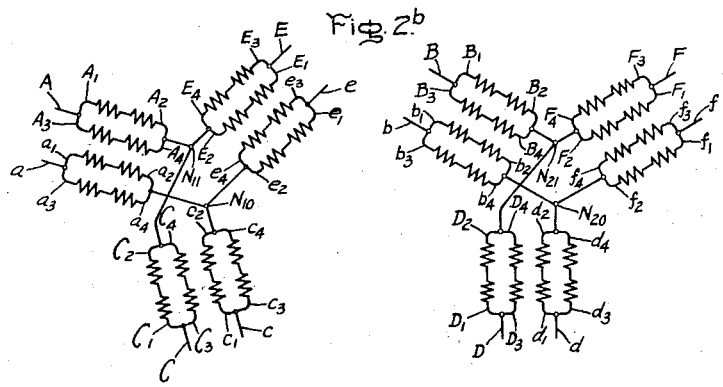

Nov. 17, 1931.                F. W. GAY                1,832,700
               DYNAMO ELECTRIC MACHINE WINDING
                  Filed Oct. 8, 1927          3 Sheets-Sheet 1
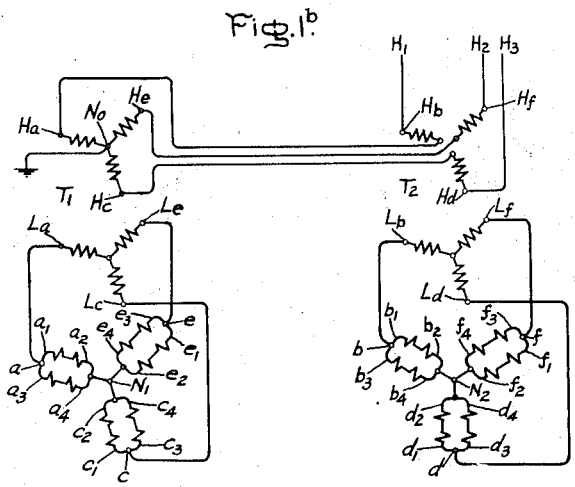
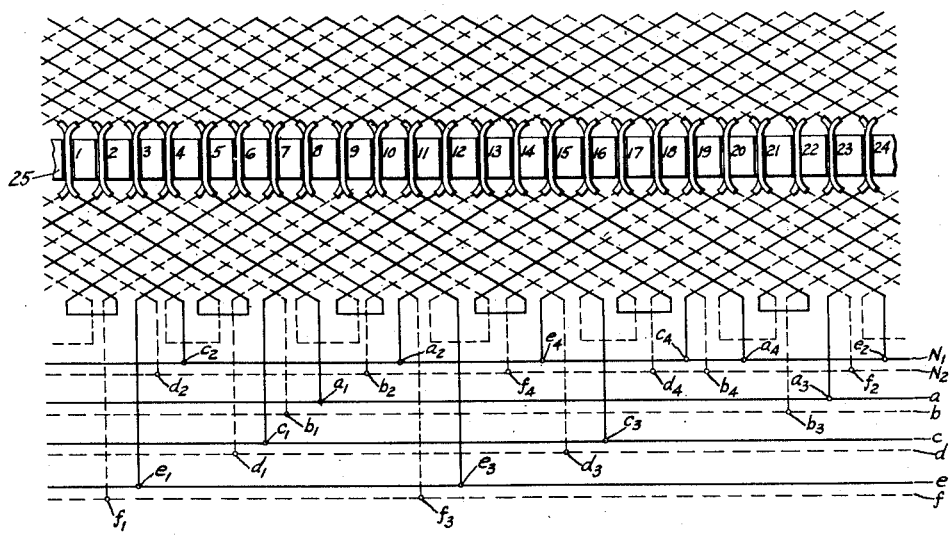
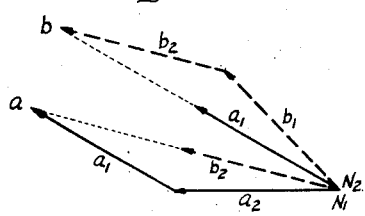
Inventor:
Frazer W. Gay,
by Charles E. Tullar
His Attorney.

Nov. 17, 1931.  F. W. GAY  1,832,700
DYNAMO ELECTRIC MACHINE WINDING
Filed Oct. 8, 1927  3 Sheets-Sheet 2

Inventor:
Frazer W. Gay,
by Charles E. Mullin
His Attorney.

Nov. 17, 1931.   F. W. GAY   1,832,700
DYNAMO ELECTRIC MACHINE WINDING
Filed Oct. 8, 1927   3 Sheets-Sheet 3
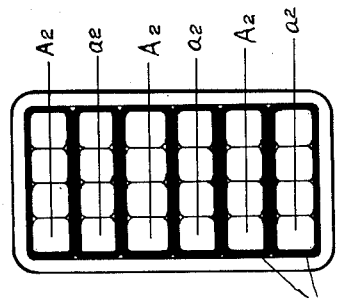
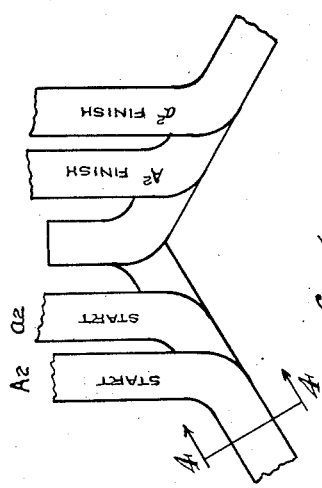
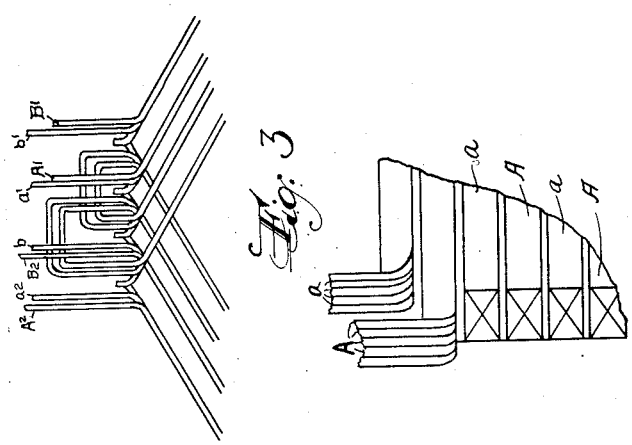
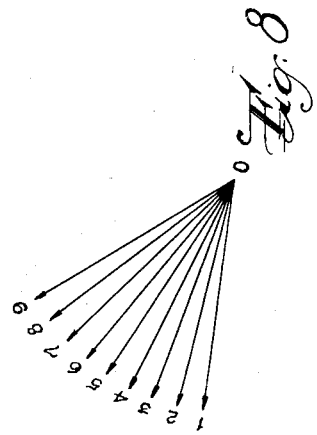
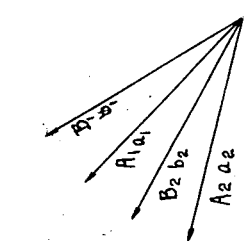
INVENTOR.
Frazer W. Gay:
BY
George D. Richards
ATTORNEY.

Patented Nov. 17, 1931

1,832,700

UNITED STATES PATENT OFFICE

FRAZER W. GAY, OF NEWARK, NEW JERSEY, ASSIGNOR TO GENERAL ELECTRIC COMPANY, A CORPORATION OF NEW YORK

DYNAMO-ELECTRIC MACHINE WINDING

Application filed October 8, 1927. Serial No. 224,811.

This invention relates, generally, to improved structures or arrangements of coils and connections in electrical machines, and more particularly to improved structures and arrangements of coils, windings, and connections in alternating current dynamo-electric machines, particularly alternating current generators.

It is an object of my invention to provide a novel method of arranging windings and coils in electrical machines and the connections thereof to transformers so as to space apart at considerable distances any and all coils, windings, connections, leads, and so on, which have a potential difference between them so that existence of high voltage between adjacent coils in the same stator or rotor slot may be eliminated; that the existence of high voltage between the connection ends of adjacent machine coils may be eliminated; that the maximum voltage generated in the machine may be greatly reduced over present practice; that any two coils occupying a slot in common may be accidentally connected together without setting up a short circuit; that any two adjacent coils of separately insulated circuits may be accidentally connected together at the end connection thereof without setting up a short circuit; and that a coil in each separately insulated circuit may be accidentally grounded without setting up a short circuit. Briefly stated, the invention has for its principal object to effect phase segregation in the windings of generators, motors, converters and so on.

The increase in size and importance of individual turbo generators makes it imperative that the condition of the electrical insulation in the machine may be periodically inspected at off peak periods and any defects in insulation detected and corrected before such defects result in unforeseen and serious interruptions to service. This invention goes even further and in addition to making it possible for an operator to periodically test each and every square inch of insulation in the machine with any desired value of test voltage so as to assure himself that every bit of insulation is in perfect condition when the machine goes into service, allows a failure at any particular part of the insulation in service without the setting up of a short circuit with its attendant destruction of windings.

A machine wound according to the principles set forth in this invention may be kept in operation if found necessary with an insulation failure at any point and in fact with many such failures provided only that no two failures occur between any two electrical circuits. Novel winding schemes allowing a multiplicity of separately insulated and mechanically spaced circuits have been described in my applications for patents Serial #196,218, filed June 3rd, 1927, and Serial No. 254,560 filed February 15, 1928. For some years now it has been the practice of operating engineers to keep electrical circuits having high voltage between them mechanically spaced apart in their switch galleries, etc., and more recently it has become common practice to keep phase voltage very widely separated by assigning a switch gallery floor to each such phase voltage and carefully keeping any other phase voltage off this floor. However, the designers of machines have made few improvements in this respect and still continue to force conductors having a very high voltage between them to lie together in a common machine slot whose section is limited to only a few inches in its greatest dimension. In my applications for patents Serial No. 196,218 and Serial No. 254,560 hereinbefore mentioned, I have shown how this voltage segregation may be carried into the machine windings so as to have no two adjacent coils in the same electrical circuit. In this invention I show how this voltage segregation may be carried into the machine coils.

Now in machines as at present marketed there is no means by which the purchaser of a machine can determine the strength of insulation between the various turns in an electrical winding. Great care is taken to test the strength of the insulation between the copper conductors and ground, and recently the improvement in high voltage direct current testing by reason of the commercial development of high voltage vacuum tube such as the Kenetron has made it possible to form some opinion of the condition of such insulation and even predict its probable future life. Yet in the case of rotating machinery the very nature of the construction of the windings in the usual case makes it impossible to make any such tests between turns in a coil and the operator is asked to run the machine until it breaks down. Unfortunately when the machine breaks down the operator may feel confident that there was some defect at the point of failure but the evidence of such defect is generally destroyed together with the entire winding and some times even the iron parts of the machine must be replaced. From such failures as do not cause complete destruction it is evident that many failures develop between turns in the coils themselves, especially around the noses of the coils at the front (connection) end and rear end. Many other failures develop between turns on the straight aways especially at points where coils leave the iron core.

The principles of my invention may be more readily understood by referring to the attached drawings in which:—

Figure 2:
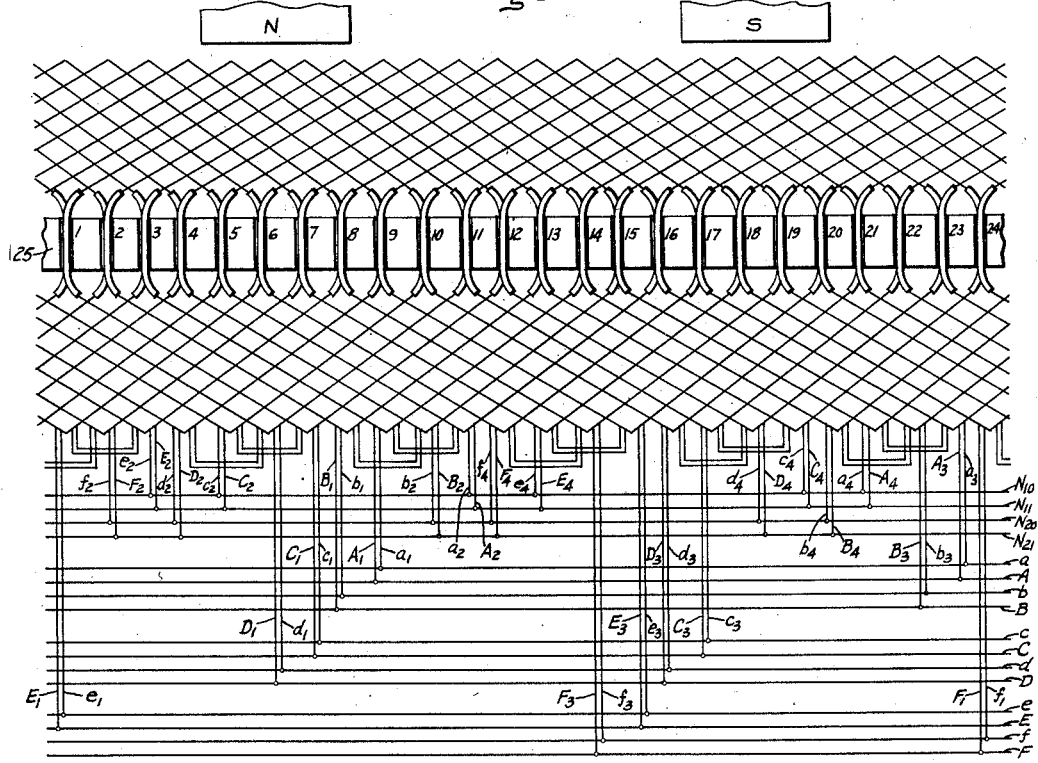
Figure 2A:
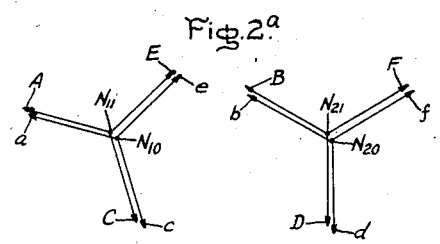

Fig. 1 is a diagrammatic representation on a plane surface of a winding comprising two independent three phase circuits embodying my invention, Fig. 1a is a vectorial representation of coil voltages to show the phase relation between voltages in coil groups of the nearest corresponding phase of each of the independent circuits, Fig. 1b is a diagrammatic illustration of the two three-phase independent circuits and their general connection and relation to distribution transformers, Fig. 2 is a modification of the arrangement shown in Fig. 1 showing diagrammatically on a plane surface four independent three-phase circuits arranged in groups in which each group has two separately insulated circuits with voltages of the same magnitude and phase. Fig. 2a is a vector diagram of the voltages of the windings illustrated in Fig. 2, Fig. 2b is a diagrammatic view illustrating the general connections of the windings. Fig. 3 is a developed plan view showing somewhat diagrammatically portions of a group of stator coils taken at the tap-off end, Fig. 4 is an enlarged view of certain ones of the coils as shown in Fig. 3, Fig. 5 is a transverse sectional view taken along the line 4—4 of Fig. 4 and enlarged therefrom, Fig. 6 is a vector diagram of voltage values on different sets of coils, Fig. 7 is a fragmentary view of an arrangement of windings on a transformer energized from a generator having the arrangement of windings shown in Fig. 2, and Fig. 8 is a vector diagram showing the relation of voltage values on a certain set of coils in a hypothetical circuit.

Referring to Fig. 1 of the drawings, I have here represented a two layer lap winding for a two pole, three-phase alternator. There are two separately insulated three-phase circuits with single turn coils. In this particular instance there are 24 slots with coils having a fractional pitch of 11 slots. All the coils are identical in construction and have the same slot pitch. It will be understood, however, that my invention is not limited to any particular number of slots or particular coil pitch and may be used equally well with any suitable odd pitch. To facilitate reading the drawings one independent circuit is shown in full lines with the phase terminal designations of $a$, $c$ and $e$, while the other circuit is shown in dotted lines with the phase terminal designations of $b$, $d$ and $f$. The first mentioned phase group is connected in star with a neutral designated by $N_1$ and the second phase group is connected in star with a neutral designated by $N_2$. The slots are designated by numerals 1 to 24 inclusive.

It is, of course, understood that any suitable form of cooperating secondary or field winding such as a salient pole direct current rotor, a squirrel cage rotor, or a wound rotor may be utilized to render the dynamo-electric machine complete, but since suitable windings and arrangements for field structures are well known in the art it is not considered essential to mention them in any further detail.

In Fig. 1 of the drawings, 25 represents the magnetic core for the armature winding which in practice would ordinarily be the stator and which would be constructed like the stator of a standard alternating current dynamo-electric machine which as well known in the art consists of a laminated core slotted to receive the winding. Each phase winding as shown comprises a similar group of coils under each pole which are connected in parallel but it will be obvious that these circuits may be connected in series if a higher voltage is required. For purposes of explaining the arrangement of the various coils of a given phase group I have designated the terminals of the coils of phase "$a$" under one pole as $a_1$ and $a_2$, respectively, and the terminals of the coils connected in parallel therewith under the other pole as $a_3$ and $a_4$, respectively. We will now consider phase $a$ of circuit $a$, $c$, $e$ and assume current to flow at any instant from the neutral terminal $N_1$ toward the terminal ends of the parallel circuits of phase winding $a$. The circuit from $a_2$ to $a_1$ in consecutive order of coil sides designated by slot numbers is 16, 5, 14 and 3 and from $a_1$ to $a_3$ is 15, 2, 17 and 4. Since phase $b$ of the circuit $b$, $d$, $f$ has a voltage which more nearly corresponds than any other voltage in phase position to the voltage of phase $a$ of circuit $a$, $c$, $e$ it will be helpful in understanding the arrangement of the various circuits to examine the position of the coil sides constituting phase $b$. Phase $b$, similarly to phase $a$, comprises two similar groups of coils under opposite poles which are connected in parallel. The terminals of these coils are designated similarly to the $a$ coils as $b_1$ and $b_2$ respectively and $b_3$ and $b_4$ respectively. The circuit from $b_2$ to $b_1$ in consecutive order of coil sides designated by slot numbers is 15, 4, 13, and 2 and from $b_4$ to $b_3$ is 14, 1, 16 and 3. The remaining phase windings of the two independent circuits are designated similarly to the windings of phase $a$ and will be readily recognized in the drawings by the phase winding letter designation and the subscripts. Thus the terminals of the remaining phase windings of circuit $a$, $c$, $e$ are designated as $c_1$, $c_2$; $c_3$, $c_4$; and $e_1$, $e_2$; $e_3$, $e_4$. The terminals of the remaining phase windings of circuit $b$, $d$, $f$ are designated $d_1$, $d_2$; $d_3$, $d_4$; and $f_1$, $f_2$; $f_3$, $f_4$. It is believed that the circuit for the various windings will be readily traced by an inspection of the drawings, and it will not be necessary to outline the various circuits in any further detail. It will be observed that the winding elements of each circuit are maintained segregated throughout. Thus, the active conductors, that is, the coil sides in the slots, of the coils of phase winding $a$ are each arranged in different slots and also in different slots from any other portions of the circuit $a$, $c$, $e$.

It may also be noted that although portions of one winding cross portions of the same winding in the end connections, it will readily be seen that the inside and outside layers of coils may be made to slope rapidly away from each other when they leave the core so that at nearly all crossings there may be a mechanical spacing of several inches and even at the crossing nearest the core ample mechanical clearance may be provided, reinforced by solid insulation, if additional protection is required.

In Fig. 1$a$ the vectorial relation of the voltages of the phase winding $a$ between the terminals $a_1$ and $a_2$ is shown in comparison with the voltage of phase winding $b$ between corresponding terminals $b_1$ and $b_2$. This shows clearly the voltage vector relations of all four coils constituting a phase group under one pole. The generated voltage of the three phase circuit $a$, $c$, $e$ differs in time phase from the generated voltage of the three phase circuit $b$, $d$, $f$, by the time phase displacement between two adjacent coils, that is, 15 electrical degrees. A study of Fig. 1$a$ will show that the voltage of the four coils $a_2$, $b_2$, $a_1$, $b_1$ which constitute one phase belt under one pole differ from the next adjacent coil in the time phase displacement of their generated voltage by 15 electrical degrees. Since the two coils, $a_1$ and $a_2$ are connected in series to give a vector sum of voltage equal to $a$—$N_1$ and the coils $b_1$ and $b_2$ are similarly connected to give a vector sum of voltage equal to $b$—$N_2$, the generated voltage of phase $a$ differs in time phase from the generated voltage of phase $b$ by the same amount as the voltage of coil $b_2$ differs from $a_1$, that is, by 15 electrical degrees.

In Fig. 1$b$ I have shown diagrammatically the general connections of the windings. The three phase circuits $a$, $c$, $e$ and $b$, $d$, $f$ are connected to the low voltage winding L$a$, L$c$, L$e$ of transformer $T_1$, and to the low voltage windings of L$b$, L$d$, L$f$ of transformer $T_2$ respectively. The high voltage windings of $T_1$ and $T_2$ are connected in series to supply power to the three phase high voltage distribution circuit indicated by conductors $H_1$, $H_2$ and $H_3$.

From an examination of the foregoing arrangement it will be apparent, that since the generator circuit $a$, $c$, $e$ and its connected transformer circuit L$a$, L$c$, L$e$ are entirely separate and insulated from the generator electrical three phase circuit $b$, $d$, $f$ and its connected transformer L$b$, L$d$, L$f$ an accidental electrical connection between any point of one circuit and any point of another circuit will not cause detrimental currents to flow and the machine may be maintained in operation until such a time as is found convenient to make repairs. In view of the fact that practically all break-downs in windings occur between adjacent electrical conductors due either to mechanical injury, electrical stress or probably both it will be apparent that a winding arranged in accordance with my invention affords adequate protection against difficulties due to this type of breakdown. For instance, at slot 16 a tooth lamination may be driven over and cut both coils $a_2$ and $b_3$ but this will merely connect phase $a$ of circuit $a$, $c$, $e$ with phase $b$ of circuit $b$, $d$, $f$ without causing current to flow.

In Fig. 2 I have shown a lap winding for a two pole, three phase alternator similar to the winding arrangement shown in Fig. 1 but in this arrangement there are four separately insulated circuits arranged in groups each comprising two circuits. The magnitude and phase of the voltage of the two circuits of each group are the same but there is a phase displacement between the voltages of the different groups. In the drawings, windings $a$—$c$—$e$ and A—C—E represent groups of two separately insulated circuits of common time phase and windings $b$—$d$—$f$ and B—D—F represent the other group of two separately insulated circuits of common time phase. Each phase of each such winding consists of two circuits in multiple, for instance the "$a$" phase of the $a$—$c$—$e$ winding consists of two circuits one similarly located under each pole that generates E. M. F. of common time phase, viz., $a1$—$a2$, $a3$—$a4$, likewise the $c$ phase of the $a$—$c$—$e$ winding consists of the two polar circuits $c1$—$c2$, $c3$—$c4$, and the $e$ phase consists of the circuits $e1$—$e2$, $e3$—$e4$.

From a study of Fig. 2 it is seen that no two coils of the windings a—c—e, A—C—E, b—d—f or B—D—F are contiguous at any point. Each coil of a given circuit in a given slot is separated from its neighbor by a coil side of another separately insulated circuit. It is therefore evident that one half of each slot is occupied by a coil of the windings a—c—e, A—C—E and the other half of the same slot is occupied by a coil of the windings b—d—f, B—D—F. Since the windings a—c—e and A—C—E are separately insulated from the windings b—d—f and B—D—F it is evident that if test voltage is applied between the windings a—c—e, and A—C—E on the one hand and b—d—f and B—D—F on the other hand such test voltage is applied to each and every square inch of insulation, serving to insulate each coil from its neighbor on either side and from its neighbor in the same slot. It is also evident that should there be an accidental break down between any two adjacent coils, a destructive power current could not flow through such fault. This will be evident when it is observed that no two adjacent coils are connected in the same circuit. There is substantially no inherent difference of potential between the adjacent coils in a given slot which may cause a damaging current to flow and hence no damage can result from a failure of insulation between adjacent coils.

Now in Fig. 6 I have shown the vector relation of the E. M. F.'s generated in the stator coils having leads marked $a2$, $A2$; $b2$, $B2$; $a1$, $A1$ and $b1$, $B1$. Now it is evident, since the $a2$ circuit is connected as shown in series in E. M. F. additive relation with the $a1$ circuit, and similarly the $A_2$ circuit is connected in E. M. F. additive relation with the $A_1$ circuit, that the time phase of the E. M. F. generated in a given coil of the $a_1$ or $A_1$ circuit lies midway between the time phase of the E. M. F.'s of the coils $b_1$ and $b_2$, and $B_1$ $B_2$, and that the vector sum of the coil voltages of $a_1$ and $a_2$ is in time phase with the E. M. F. generated in the coil $b_2$ or $B_2$. In the same manner it can be shown that the time phase of the vector sum of the voltages generated in the windings formed by conducting the $b_2$ circuit in series in E. M. F. additive relation with the $b_1$ circuit and similarly the $B_2$ circuit is connected in E. M. F. additive relation with the $B_1$ circuit, is the same as the time phase of the E. M. F. generated in the winding $a_1$ or $A_1$. In other words, there is a time phase difference between the $a$ or $A$ circuits and the $b$ or $B$ circuits of substantially fifteen (15) electrical degrees.

Fig. 5 shows an enlarged section 4—4 of the coil shown in Fig. 4. Fig. 5 shows three turns in each of the two circuits or turns per coil. This section shows that any two turns in one circuit are separated by a turn in the other electrical circuit. Therefore, if a test voltage is applied between the "$a$" circuit and the "A" circuit, this test voltage is applied between every adjacent turn in the coils making up these circuits and constitutes a test applied to every square inch of turn insulation in these coils. A study of Figure 1 will show that if a test voltage is applied between each of the three phase circuits shown and the three other three phase circuits, applying the voltage between each circuit in turn and the three other circuits, then every square inch of insulation between adjacent coils, between top and bottom coils in a slot and between turns in each coil has been subject to this test voltage. Now if a test is made between all circuits and ground, an operator can be assured that the machine insulation is in safe, operating condition. In addition the top and bottom end windings of the machine are mechanically spaced apart.

In Fig. 7 I have shown a fragmentary view of the arrangement of the windings for a transformer similar to $T_1$ of Fig. 1 suitable for use in connection with the dynamo-electric machine shown in Fig. 2. As shown in this figure there are two separately insulated circuits—$a, a, a$, etc. and A, A, A, etc. Each turn in one electrical circuit is separated from the next turn in the same circuit by a turn in the other separately insulated circuit. It is therefore possible to test the coil insulation between turns by applying a test voltage between the two separately insulated circuits and if the machine circuits and transformer circuits are connected in Figure 1 then when the tests are made on the machine circuits as explained above, the turn insulation in the transformer primary is tested at the same time.

Now in a very large machine the number of stator coils will normally be much larger than I have shown, probably eight or nine coils per pole per phase. It is one of the advantages of my invention that the amount of power required to be handled in any circuit is limited and is approximately inversely proportional to the number of separately insulated three phase circuits in the machine, so that while any number of separately insulated circuits may be used in the machine as desired, the purchaser will probably require a number of circuits approximately proportional to the number of coils in the machine.

In Fig. 8 I have shown in vector relation nine circuits per phase, each circuit including two coils in series and each and every coil being identical in construction, insulation, size copper, number of turns, etc. The last circuit to the right in each phase i. e. every ninth circuit may be connected to form two separately insulated three phase circuits for supplying power to the machine auxiliaries. There will therefore be two independent and separately insulated sources of power for use of the auxiliaries of each machine. In the winding arrangement a short circuit across the secondary of the machine transformer bank, even if close to the transformer terminals will not drag down the machine voltage to nearly zero, by reason of the relatively high impedance of the transformer with respect to the generator. The voltage across the winding connected for auxiliary power will be relatively still higher because there will be no short circuit current flowing through this winding. It will therefore be possible to maintain the necessary power supply to the machine auxiliaries even in case of a short circuit at the high tension terminals of the transformer.

Referring further to Fig. 8 I have numbered the circuits from 1 to 9 respectively. The two coils in circuit No. 3 are connected in series in E. M. F. additive relation with the two coils in circuit No. 5 and the time phase of their generated E. M. F. is the same as the time phase of the E. M. F. generated in the intermediate circuit No. 4. Likewise the two coils in circuit No. 1 are connected in series with the two coils in circuit No. 7 and the time phase of the E. M. F. generated in the two circuits so formed is also the same as the time phase of the E. M. F. generated in the intermediate circuit No. 4. Now these four circuits may feed transformer coils on one magnetic transformer leg. It is evident that the vector sum of voltages generated in circuits 3 and 5 will be slightly greater than the vector sum of the voltages generated in coils 1 and 7. These voltages may be brought to a common value and feed equal turn primaries by passing the circuits through voltage changing means as fully covered in application for patent Serial No. 254,560 previously mentioned, or a leakage path may be set up between the primaries fed by circuits 3 and 5 and primaries fed by circuits 1 and 7 or as fully covered by application Serial No. 196,218, or the number of turns on said primaries may be made proportional to the cosine of the angle by which the E. M. F. in the corresponding generator coils differs in time phase from the mean time phase of the E. M. F. induced in said primaries. In the same manner the coils in circuits 4 and 6 and the coils in circuits 2 and 8 may be connected in series to form phase windings having generated E. M. F.'s in time phase with the E. M. F. generated in coil 5. These last four circuits may feed primaries on another magnetic transformer leg.

Now my drawings are to be taken as merely explanatory of the principle involved and not in a limiting sense. For instance more than two separately insulated circuits per coil may be used if desired, or the auxiliary power circuit need not be in duplicate. It may consist of single turn coils, all such single turn coils per machine being in series, series multiple or multiple as desired or provision for auxiliary power may not be made in the machine. Any number of coils per pole per phase may be used and more than two time phases per machine phase may be used if desired. A three phase transformer may be used instead of three single phase transformers as explained in applications for patent Serial No. 196,218 and Serial No. 254,560 previously mentioned.

I may wish to so locate my power auxiliary circuit so that it may be multipled with station power circuits. In this case the machine auxiliary coil or coils per phase group may be the middle coil or coils of the phase group and the remaining coils of the phase group will be connected so that each circuit with E. M. F. lagging in time phase the E. M. F. generated in the auxiliary coils of that phase will be connected in series in E. M. F. additive relation with an equal voltage circuit with E. M. F. leading the same amount in time phase the E. M. F. generated in said auxiliary coils. It is also evident that if I wish to use one turn coils the multiple turn per coil will no longer be necessary but I may form a number of paths generating E. M. F. of common time phase by connecting two coils in series in each path, one coil lagging in time phase the time phase of the path and the other coil leading in time phase the time phase of the path, said time phase lead in one case being equal to said time phase lag in the other case. Now it is very evident that all circuits generating E. M. F. of common time phase may be connected in multiple and tests between turns may be made by disconnecting said windings.

I am fully aware that changes may be made in the general arrangements and combinations of the various devices and parts, as well as in the details of the construction of the said parts, without departing from the scope of the present invention, as set forth in the foregoing specification, and as defined in the clauses of the claims which are appended thereto. Hence, I do not limit my present invention to the exact arrangements and combinations of the various devices and parts as described in the said specification, nor do I confine myself to the exact details of the construction of the said parts, as illustrated in the accompanying drawings.

I claim:—

1. A dynamo-electric machine having a plurality of separately insulated polyphase windings, each polyphase winding including single phase groups of windings in which each group comprises a plurality of parallel circuits, each of said parallel circuits consisting of coils in series and so disposed as to generate a resultant electromotive force having a time phase common to the associated group, one half of said coils of one circuit being so disposed as to generate an electromotive force which leads the electromotive force of the associated group, and the other half of the coils of the same circuit being adapted to generate an electromotive force which lags the electromotive force of the given group by as much as the said first half leads.

2. A dynamo-electric machine having a plurality of separately insulated polyphase windings, each polyphase winding including single phase groups of windings in which each group comprises a plurality of parallel circuits, each of said parallel circuits consisting of coils in series and so disposed as to generate a resultant electromotive force having a time phase common to the associated group, one half of said coils of one circuit being so disposed as to generate an electromotive force which leads the electromotive force of the associated group, and the other half of the coils of the same circuit being adapted to generate an electromotive force which lags the electromotive force of the given group by as much as the said first half leads, and being further characterized by the fact that adjacent coil sides in the same slot are coil sides of separate polyphase circuits.

3. In a dynamo-electric machine, a plurality of separately insulated polyphase circuits, each circuit comprising a plurality of phase groups, the coil sides of each phase group being so arranged that the adjacent coil sides in the same slot belong to different polyphase circuits.

4. In a dynamo-electric machine, a plurality of separately insulated polyphase circuits, each circuit comprising a plurality of phase groups, the coil sides of each phase group being so arranged that the adjacent coil sides in every slot belong to different polyphase circuits and in certain slots have substantially the same potential.

5. A dynamo-electric machine having a plurality of separately insulated polyphase windings, each polyphase winding including single phase groups comprising a plurality of parallel circuits having series connected coils, the coils of each parallel circuit being so disposed as to generate an electromotive force having a time phase for the circuit common to that of its associated circuit, and each of said circuits comprising a plurality of equal turn coils arranged in relation to each other so that the electromotive force of one-half of said coils leads the other half thereof.

6. A polyphase winding comprising a plurality of phase groups, each of said phase groups comprising parallel connected circuits, each of said circuits comprising series connected coils so disposed as to generate an electromotive force of a value common to each set of coils in a given group and having a common time phase, the resultant voltage of phase groups differing from each other in time phase by the time phase difference of electromotive forces in two adjacent coils.

7. A polyphase winding comprising a plurality of phase groups, each of said phase groups comprising parallel connected circuits, each of said circuits comprising series connected coils so disposed as to generate an electromotive force of a value common to each set of coils in a given group and having a common time phase, the resultant voltage of phase groups differing from each other in time phase by the time phase difference of electromotive forces in two adjacent coils, said coils of each parallel circuit being arranged in relation to each other so that the electromotive force of one-half of said coils of a given parallel circuit differs in value from the mean electromotive force of all coil circuits of a group by as much as the other half of said coils of another circuit of the said group but of opposite sign.

8. A dynamo-electric machine provided with a plurality of separate polyphase windings, each polyphase winding including phase groups consisting of a plurality of parallel circuits with each circuit including turns in series, a plurality of said windings being formed in coils in such a manner that no two adjacent turns in any coil belong to the same winding, a group of said coils of each phase group being connected to constitute a multiplicity of separately insulated windings of substantially common time phase, each of said coils comprising parallel circuits so selected and connected that in certain of said turns of each parallel circuit the generated electromotive force lags the electromotive force of its group by a given value and the electromotive force of the other of said turns of the same circuit leads the electromotive force of the group by the same given value.

9. A dynamo-electric machine provided with a plurality of separate polyphase windings, each polyphase winding including phase groups consisting of a plurality of parallel circuits with each circuit including turns in series, a plurality of said windings being formed in coils in such a manner that no two adjacent turns in any coil belong to the same windings, a group of said coils of each phase group being connected to constitute a multiplicity of separately insulated windings of common time phase, each of said coils comprising parallel circuits so selected and connected that in certain turns of each parallel circuit the generated electromotive force lags the electromotive force of its group by a given value and the electromotive force of the other of said turns of the same circuit leads the electromotive force of the group by the same given value, said machine having a magnetic body having slots in which said coils are placed, and said turns being so connected and said coils being so pitched in their slots that no two coils in the same slot belong to the same polyphase winding.

10. A dynamo-electric machine having a plurality of separately insulated three phase windings, each winding comprising a plurality of phase groups consisting of a plurality of series connected turns, each parallel circuit of a given phase of a polar group of said windings being adapted to generate an electromotive force of substantially common value and time phase, the electromotive force of the series turns in each phase group all differing in value, the series turns being so disposed as to form a phase circuit so that the amount by which certain series turns of said parallel circuit differs in magnitude and time phase of its electromotive force from the average of the group is compensated by a like difference in magnitude and time phase of the electromotive on the part of the same number of series turns of another parallel circuit of the same group, the differences in one circuit being of opposite sign to the differences in the other.

11. A dynamo-electric machine having a plurality of separately insulated three phase windings each comprising single phase winding groups consisting of a plurality of parallel circuits of series connected turns, a phase group of said windings being adapted to generate a resultant electromotive force of a given time phase and each having its series turns so connected that certain turns in a given phase group which is adapted to generate an electromotive force lagging in time phase with respect to the time phase of its group is connected in series with certain turns adapted to generate an electromotive force which leads the phase of the group by a difference value equal to the difference between the lagging phase and the group phase.

12. An alternating current dynamo-electric machine provided with separate polyphase windings electrically insulated and connected to insulated loads, each polyphase winding including separate phase winding groups comprising a plurality of parallel connected circuits, each of the parallel connected circuits of a given group being so disposed as to generate an electromotive force of a common time phase and each consisting of series connected coils, each of said series connected coils being so disposed as to generate electromotive forces differing in value and to produce a resultant electromotive force the same as that of its phase group.

13. An alternating current dynamo-electric machine provided with separate polyphase windings electrically insulated and connected to insulated loads, each polyphase winding including separate phase winding groups comprising a plurality of parallel connected circuits, each of the parallel connected circuits of a given group being so disposed as to generate an electromotive force of a common time phase and each consisting of series connected coils, each of said series connected coils being so disposed as to generate electromotive forces differing in value and to produce a resultant electromotive force the same as that of its phase group, the coil sides of said winding being so arranged that adjacent coil sides in the same slot belong to different polyphase windings.

In testimony, that I claim the invention set forth above I have hereunto set my hand this 4th day of October, 1927.

FRAZER W. GAY.